United States Patent [19]

Chun et al.

[11] Patent Number: 5,452,387
[45] Date of Patent: Sep. 19, 1995

[54] COAXIAL OPTOELECTRONIC MOUNT AND METHOD OF MAKING SAME

[75] Inventors: Christopher K. Y. Chun, Gilbert; Michael S. Lebby, Apache Junction, both of Ariz.

[73] Assignee: Motorola, Inc., Schaumburg, Ill.

[21] Appl. No.: 326,883

[22] Filed: Oct. 21, 1994

[51] Int. Cl.⁶ .............................................. G02B 6/42
[52] U.S. Cl. ....................................... 385/88; 385/14; 385/15; 385/31; 385/39; 385/49; 385/51; 385/92; 385/94
[58] Field of Search ....................... 385/15, 27, 31, 38, 385/39, 49, 51, 88, 92, 14, 94; 250/227.11

[56] References Cited

U.S. PATENT DOCUMENTS

| | | | |
|---|---|---|---|
| 3,792,284 | 2/1974 | Kaelin | 385/92 X |
| 3,803,409 | 4/1974 | Prochazka | 385/92 X |
| 3,809,908 | 5/1974 | Clanton | 385/88 X |
| 3,878,397 | 4/1975 | Robb et al. | 385/88 X |
| 4,314,740 | 2/1982 | Bickel | 385/127 X |
| 4,776,659 | 10/1988 | Mruk | 385/88 X |
| 4,779,948 | 10/1988 | Wais et al. | 385/88 X |
| 4,790,620 | 12/1988 | Niwayama | 385/88 X |
| 5,165,002 | 11/1992 | Cumberledge et al. | 385/92 |
| 5,228,101 | 7/1993 | Chun et al. | 385/91 X |
| 5,247,596 | 9/1993 | Maignan et al. | 385/88 |
| 5,276,754 | 1/1994 | Blair et al. | 385/88 |

*Primary Examiner*—Brian Healy
*Attorney, Agent, or Firm*—Gary F. Witting

[57] ABSTRACT

A coaxial optoelectronic mount is provided. A coax cable having an inner conductor, an outer conductor, and an insulating region therebetween, and an end is formed. The end of the coax cable exposes portions of the inner conductor, the outer conductor, and the insulating region. A photonic device having a working portion, a first contact, and a second contact is mounted on the end of the coaxial cable. An optical fiber having a core region with a refractive index, a cladding region with a refractive index, and a surface is aligned to the working portion of the photonic device. An optical gel having a refractive index is disposed on the surface of the optical fiber and on the working portion of the photonic device operatively coupling the core region of the optical fiber to the working portion of the photonic device.

14 Claims, 1 Drawing Sheet

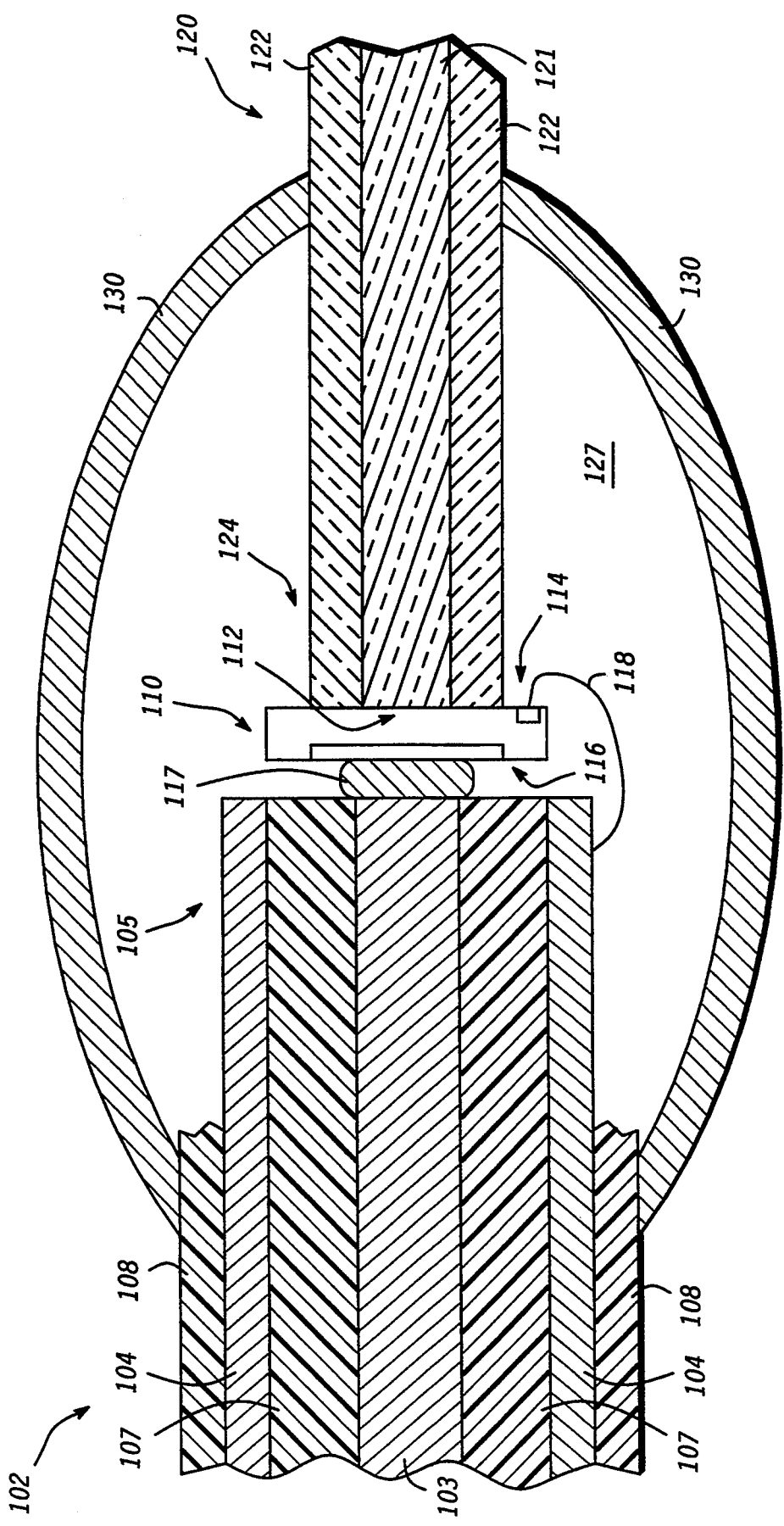

COAXIAL OPTOELECTRONIC MOUNT AND METHOD OF MAKING SAME

FIELD OF THE INVENTION

This invention relates, in general, to optical devices and, more particularly, to coupling of optical devices.

BACKGROUND OF THE INVENTION

Presently, optical elements and electrical elements are not effectively integrated, thus not allowing advantages or strengths of either the optical or the electrical elements to be synergistically used. By not providing coupling methods that are easily used, manufactureable, and effective, the integration of optical and electrical elements will be severely limited.

Conventionally, direct coupling of an electrical cable to optical cable, such as a coaxial cable and an optical fiber is not done, thus not enabling the integration of these electrical and optical elements into a unified system. Since direct coupling of electrical and optical cables is not done, electrical and optical cables are not interchangeable, thereby not allowing flexibility.

Therefore, it is desirable to provide a method and article for the integration of a coaxial cable and an optical fiber, thereby integrating the coaxial cable and the optical fiber.

BRIEF DESCRIPTION OF THE DRAWING

In a sole FIGURE, a simplified enlarged sectional view of a coaxial optoelectronic mount is shown.

DETAILED DESCRIPTION OF THE DRAWING

Referring to the sole FIGURE, a coaxial optoelectronic mount 101 is illustrated in accordance to the present invention. Coaxial optoelectronic mount 101 is shown having several elements, such as a coaxial cable 102, a conductive member 117, a conductive apparatus 118, a photonic device 110, a material 127, a coating 130, and an optical fiber 120. Coaxial cable 102 is shown to include an inner conductor 103, an insulating region 107, an outer conductor 104, a sheath 108, and an end 105. Photonic device 110 is shown to include a working portion 112 and contacts 114 and 116. Optical fiber 120 is shown to include a core region 121, a cladding region 122, and a surface 124.

Coax cable or coaxial cable 102 is made of any suitable coaxial cable having inner conductor 103, outer conductor 104, insulating region 107 being positioned therebetween, and sheath 108. Generally, outer conductor 104, insulating region 107, and sheath 108 are axially aligned around inner conductor 103, thereby providing a spatial arrangement as shown in the FIGURE. End region 105 of coax cable 102 is formed by cutting coax cable 102 perpendicular to inner conductor 103, thereby generating a circular surface with concentrically arranged insulating region 107, outer conductor 104, and sheath 108. As shown in the FIGURE, a portion of sheath 108 is removed from end region 105 of coax cable 102 to expose a portion of outer conductor 104 along sides of coax cable 105.

Conductive apparatus 118 is made of any suitable conductive structure, such as a wire bond, a conductive lead, or the like, thereby enabling contact 114 of photonic device 110, and outer conductor 104 of cable 102 to be electrically coupled. While many conductive structures are potentially usable, in a preferred embodiment of the present invention, conductive apparatus 118 is a wire bond. Wire bonding is well known in the art and is automated, thereby facilitating manufactureablity.

Conductive member 117 is made any suitable conductive apparatus and material, such as a bump, a pillar, a layer, or the like that are made of gold, silver, solder, tungsten, conductive polymers, and the like. Conductive member 117 electrically couples inner conductor 103 of coax cable 102 to contact 116 of photonic device 110. In a preferred embodiment of the present invention, electrical coupling of inner conductor 103 of coax cable 102 to contact 116 of photonic device 110 is achieved using a bump made of a conductive polymer, such as a conductive epoxy, a conductive polyimide, or the like.

As shown in the FIGURE, photonic device 110 having working portion 112 is made with contacts 114 and 116. As described hereinabove, contacts 114 and 116 are operably coupled to coax cable 102, thereby allowing electrical signals to be coupled with photonic device 110. Mounting of photonic device 110 to coax cable 102 is achieved by any suitable method, such as manually, semi-automatically, or automatically. However, in a preferred embodiment of the present invention, mounting of photonic device 110 to coax cable 102 is achieved by using an automated system such as a robotic system or the like, thereby precisely positioning inner conductor 103, conductive member 117, and photonic device 110 to facilitate mounting of photonic device 110 to coax cable 102.

Functionally, photonic device 110 is made of any suitable optoelectronic device, such as a phototransmitter or a photoreceiver. More specifically, with photonic device 110 being a phototransmitter, any suitable phototransmitter, such as a laser, e.g., a vertical cavity surface emitting laser (VCSEL), a light emitting diode (LED), or the like is used. Alternatively, with photonic device 110 being a photoreceiver any suitable photoreceiver, such as a photodiode, a PIN photodiode, or the like are used.

Optical fiber 120 having core region 121, cladding region 122, and surface 124 is made by any well-known method in the art. Generally, optical fiber 120 provides a path for optical signals to travel form one point to another point, thus enabling the light signals to travel distances through core region 121 of optical fiber 120. With surface 124 of optical fiber 120 adjacent to working portion 112 of photonic device 110, optical fiber 120 and coax cable 102 are optically and electrically coupled.

Alignment or positioning tolerance of core region 121 portion of surface 124 to working portion 112 of photonic device 110 is relaxed. For example, with photonic device 110 being a phototransmitter, working portion 112 of the phototransmitter is generally small in size in comparison to a diameter of core region 121 of optical fiber 120 which is generally large in comparison, thus making alignment of core region 121 to working portion 112 easily achieved. Further, since core region 121 of optical fiber 120 comfortably fits around working portion 112 of the phototransmitter, light signals from working portion 112 of the phototransmitter are easily captured by the core region 121 of the optical fiber 120. Thus, by relaxing the alignment tolerance, increased performance of optoelectronic mount 101 is achieved. In yet another example, with photonic device 110 being a photoreceiver, working portion 112 of the photoreceiver is generally large in size in comparison to a diameter of core region 121 of optical fiber 120 which is generally small in comparison, thus making alignment of core region 121 to working portion 112 easily achieved. Further, since core region 121 of optical fiber 120 comfortably fits around working portion 112 the phototransmitter, light signals from core region 121 of optical fiber 120 are easily captured by working portion 112 of the photoreceiver. Thus, by relaxing the alignment tolerance, increased performance of optoelectronic mount 101 is achieved. Moreover, with relaxed alignment tolerances, manufacture of coaxial optoelectronic mount 101 are facilitated. Further, as shown in the FIGURE, surface 124 of core region 121 is positioned on working portion 112; however, it should be understood that a gap between surface 124 and working portion 112 is sometimes formed with no ill effects.

With optical fiber 120 and coax cable 102 properly positioned, optical fiber 120 and coax cable 102 are attached by means of a material 127. Generally, because a small amount of material 127 may flow between surface 124 of optical fiber 120 and working portion 112 of photonic device 110, material 127 is made of an optical material having a refractive index similar to optical fiber 120. However, it should be understood that if surface 124 and working portion 112 are next to each other, then material 127 does not have to have optical characteristics.

Alternatively, in some applications, it may be desirable to use material 127 having optical characteristics similar to optical fiber 120 for joining surface 124 and working portion 112, and then covering material 127 having optical characteristics similar to optical fiber 120 for joining surface 124 with another material. For example, an optical junction is formed between surface 124 and working portion 112 having optical characteristics similar to optical fiber 120. This optical junction is formed by placing a small amount of material 127 or optical gel having optical characteristics similar to optical fiber 120 between surface 124 and working portion 112. The optical gel is then cured if necessary, after which any convenient material 127 is applied for holding the assembly in place.

Typically, material 127 is any convenient adhesive, curable gel, curable polymer, etc., which is curable if necessary, generally at or near ambient temperature and with a minimum generation of heat. Typical materials which are utilized for this purpose include silicone gels, cellulose butyrate acetate, poly methyl methacrylate, cyanoacrylate, etc. Optical fiber 120 and coax cable 102 are aligned and material 127 applied so as to create a minimum of strain in material 127 during and after the curing process. This is accomplished generally because application and the curing process, if necessary, of optical gel adds very little heat.

Once material 127 is properly applied and cured, if necessary, and the assembly is at least temporarily held in place, a coating 130 of metal is deposited over the entire junction and at least partially onto coax cable 102 and optical fiber 120. In this specific embodiment coating 130 is deposited by some convenient metalization process such as electroless plating or electroforming, which includes electrical processes such as electroplating, sputtering, etc. Coating 130 provides the physical strength to hold the assembly fixedly in place and to insure that no misalignment occurs between surface 124 and working portion 112. In some applications it may be desirable to thermally match coating 130 to material 127 to reduce the possibility of damage during ambient temperature changes.

Thus, coupling of an electrical cable and an optical fiber has been disclosed. More specifically, direct coupling of the a coaxial cable and an optical fiber that forms a coaxial optoelectronic mount is disclosed. In the disclosed optoelectronic mount, a coaxial cable with photonic device and an optical fiber are fixed together with little or no strain occurring between the coax cable or the optical fiber or on the material fixing the parts together. Further, electrical connections are easily and conveniently provided so that the completed optoelectronic mount is easily utilized in electrical circuits, such as MCMs, telephone, and computer interconnects, etc. The small size of the complete optoelectronic mount provides the advantage of additional applications not previously possible and/or practical applications in denser environments.

While we have shown and described specific embodiments of the present invention, further modifications and improvements will occur to those skilled in the art. We desire it to be understood, therefore, that this invention is not limited to the particular forms shown and we intend in the appended claims to cover all modifications that do not depart from the spirit and scope of this invention.

What is claimed is:

1. A coaxial optoelectronic mount comprising:
   a coaxial cable having an inner conductor, an outer conductor, and an insulating region therebetween, and an end, the end of the coaxial cable exposing portions of the inner conductor, the outer conductor, and the insulating region;
   a photonic device having a working portion, a first contact, and a second contact, the first contact being operatively coupled to the outer conductor of the coaxial cable and the second contact being operatively coupled to the inner conductor of the coaxial cable;
   an optical fiber having a core region with a refractive index, a cladding region with a refractive index, and a surface, the surface exposing portions of both the core region and the cladding region; and
   an optical gel having a refractive index disposed on the surface of the optical fiber and on the working portion of the photonic device operatively coupling the core region of the optical fiber to the working portion of the photonic device.

2. A coaxial optoelectronic mount as claimed in claim 1 further including a metal layer surrounding the optical gel.

3. A coaxial optoelectronic mount as claimed in claim 1 wherein the first contact being operatively coupled to the outer conductor of the coaxial cable is achieved by a wire bond.

4. A coaxial optoelectronic mount as claimed in claim 1 wherein the second contact being operatively coupled to the inner conductor of the coaxial cable is achieved by a conductive bump.

5. A coaxial optoelectronic mount as claimed in claim 1 wherein the photonic device is a phototransmitter.

6. A coaxial optoelectronic mount as claimed in claim 1 wherein the photonic device is a photoreceiver.

7. A coaxial optoelectronic mount as claimed in claim 1 wherein the optical gel having the refractive index, the refractive index ranges from 1.3 to 1.7.

8. A coaxial optoelectronic mount as claimed in claim 1 wherein the optical gel having the refractive index, the refractive index is equal to or greater than the refractive index of the core region of the optical fiber.

9. A coaxial optoelectronic mount comprising:
- a coaxial cable having an inner conductor, an outer conductor, and an insulating region therebetween, and an end, the end of the coaxial cable exposing portions of the inner conductor, the outer conductor, and the insulating region;
- a photonic device having a working portion, a first contact, and a second contact, the first contact being operatively coupled to the outer conductor of the coaxial cable and the second contact being operatively coupled to the inner conductor of the coaxial cable;
- an optical fiber having a core region having a refractive index, a cladding region having a refractive index, and a surface, the surface exposing portions of both the core region and the cladding region; and
- an optical gel having a refractive index disposed on the surface of the optical fiber and on the working portion of the photonic device operatively coupling the core region of the optical fiber to the working portion of the photonic device, wherein the refractive index of the optical gel is equal to or greater than the refractive index of the core region of the optical fiber.

10. A coaxial optoelectronic mount as claimed in claim 9 further including a metal layer surrounding the optical gel.

11. A coaxial optoelectronic mount as claimed in claim 10 wherein the metal layer is selected from a group comprising: nickel, tin, copper, and aluminum.

12. A coaxial optoelectronic mount as claimed in claim 9 wherein the first contact being operatively coupled to the outer conductor of the coaxial cable is achieved by a wire bond.

13. A coaxial optoelectronic mount as claimed in claim 9 wherein the second contact being operatively coupled to the inner conductor of the coaxial cable is achieved by a conductive bump.

14. A method for making a coaxial optoelectronic mount comprising the steps of:
- forming a coaxial cable having an inner conductor, an outer conductor, and an insulating region therebetween, and an end, the end of the coaxial cable exposing portions of the inner conductor, the outer conductor, and the insulating region;
- forming a photonic device having a working portion, a first contact, and a second contact;
- operatively coupling the first contact to the outer conductor and operatively coupling the second contact to the inner conductor;
- forming an optical fiber having a core region, a cladding region, and a surface, the surface exposing portions of both the core region and the cladding region; and
- applying an optical gel disposed on the surface of the optical fiber and on the working portion of the photonic device operatively coupling the core region of the optical fiber to the working portion of the photonic device.

* * * * *